US012780108B2

(12) United States Patent
Herrera Mezgravis et al.

(10) Patent No.: US 12,780,108 B2
(45) Date of Patent: Nov. 3, 2026

(54) RETENTION OF VEHICLE DISPLAY DEVICE

(71) Applicant: Atieva, Inc., Newark, CA (US)

(72) Inventors: Armando Andres Herrera Mezgravis, Mountain View, CA (US); Piotr Sajewicz, Wroclaw (PL); Adam Johnson Fecteau, San Jose, CA (US)

(73) Assignee: Atieva, Inc., Newark, CA (US)

( * ) Notice: Subject to any disclaimer, the term of this patent is extended or adjusted under 35 U.S.C. 154(b) by 348 days.

(21) Appl. No.: 18/510,194

(22) Filed: Nov. 15, 2023

(65) Prior Publication Data

US 2025/0153653 A1 May 15, 2025

(51) Int. Cl.
*B60R 11/02* (2006.01)
*B60R 11/00* (2006.01)

(52) U.S. Cl.
CPC ... *B60R 11/0229* (2013.01); *B60R 2011/0005* (2013.01); *B60R 2011/0052* (2013.01)

(58) Field of Classification Search
CPC ........ B60K 35/22; B60K 35/50; B60K 35/70; B60K 37/20; B60K 2360/652; B60K 2360/816; B60R 11/0229; B60R 2011/005; B60R 2011/0052
See application file for complete search history.

(56) References Cited

U.S. PATENT DOCUMENTS

| | | | |
|---|---|---|---|
| 10,946,808 | B2 | 3/2021 | Kuchibhatla et al. |
| 2022/0227307 | A1 | 7/2022 | Shout et al. |
| 2023/0166597 | A1 | 6/2023 | Günther et al. |

FOREIGN PATENT DOCUMENTS

| | | | |
|---|---|---|---|
| DE | 102013003942 A1 | 9/2014 | |
| DE | 102017116483 A1 | 1/2019 | |
| ES | 2915057 B2 | 1/2023 | |
| JP | 2013082362 A | 5/2013 | |

OTHER PUBLICATIONS

ES 2915057 B2 (Year: 2023).*
DE 202020100757 U1 (Year: 2020).*
JP 5776483 B2 (Year: 2015).*
International Search Report and Written Opinion for PCT Application No. PCT/US2024/055920, mailed on Feb. 27, 2025, 18 pages.,.

* cited by examiner

*Primary Examiner* — Lori Lyjak
(74) *Attorney, Agent, or Firm* — Brake Hughes Bellermann LLP

(57) ABSTRACT

An assembly for a vehicle comprises: a cross-vehicle beam including i) a first fail portion, wherein a first notch is formed in the first fail portion, and ii) a first pocket having a first opening that faces substantially rearward in the vehicle; and a display device mounted to the cross-vehicle beam using the first fail portion, the display device having a first arm configured to extend through the first opening, the first arm having a first cutout configured to engage with the first opening in response to failure of at least the first fail portion.

20 Claims, 10 Drawing Sheets

RETENTION OF VEHICLE DISPLAY DEVICE

TECHNICAL FIELD

This document relates to retention of a vehicle display device.

BACKGROUND

Vehicles may be subject to certain requirements due to laws, regulations or other rules applicable in the country or other jurisdiction where the vehicle is being sold. The vehicle manufacturer must get approval of the vehicle from the relevant authorities (such approval sometimes referred to as homologation) before the vehicle can be sold to customers. One category of homologation requirements relates to the status of the passenger compartment when the vehicle is involved in a collision or other event where the vehicle decelerates very quickly. In such situations, an occupant's body (e.g., the head) may collide with some part of the vehicle interior. Stated here in a simplified manner, a homologation requirement may mandate that such an impact (sometimes referred to as a head impact) does not rise to any projectiles or other loose objects in the passenger compartment. Head impact homologation requirement can stipulate a maximum head acceleration that is safe for occupants.

Many of today's vehicles have one or more display devices mounted to an instrument panel at the front of the passenger compartment. Some such display devices are free-standing from the instrument panel, meaning that they have an attachment (e.g., a base or foot or other structure) securing them to the instrument panel. Attempts have been made to design such attachments that meet homologation requirements. However, these designs have been characterized by complexity and increase of the parts count for the vehicle.

SUMMARY

In a first aspect, an assembly for a vehicle comprises: a cross-vehicle beam including i) a first fail portion, wherein a first notch is formed in the first fail portion, and ii) a first pocket having a first opening that faces substantially rearward in the vehicle; and a display device mounted to the cross-vehicle beam using the first fail portion, the display device having a first arm configured to extend through the first opening, the first arm having a first cutout configured to engage with the first opening in response to failure of at least the first fail portion.

Implementations can include any or all of the following features. The first arm has a channel profile. The first fail portion extends from the cross-vehicle beam substantially rearward in the vehicle, the first fail portion separated from a remainder of the cross-vehicle beam by the first notch. The first fail portion includes parallel walls extending substantially rearward in the vehicle and a transverse wall joining the parallel walls to each other. The first notch is formed in one of the parallel walls. The first notch has substantially a V-shape. The first fail portion further includes another notch formed in another of the parallel walls. The cross-vehicle beam further includes i) a second fail portion, wherein a second notch is formed in the second fail portion, and ii) a second pocket having a second opening that faces substantially rearward in the vehicle, and wherein the display device further includes a second arm configured to extend through the second opening, the second arm having a second cutout, wherein in response to failure of at least the first and second fail portions, the first cutout is configured to engage with the first opening, and the second cutout is configured to engage with the second opening. The first and second fail portions and the first and second openings are all horizontally aligned with each other. The first opening is positioned outboard of the first fail portion, and wherein the second opening is positioned outboard of the second fail portion. The first arm further has another cutout, the other cutout positioned across a width of the first arm from the first cutout. The first arm is configured so that the first cutout is positioned vertically above the other cutout when the display device is mounted to the cross-vehicle beam. The other cutout is wider than the first cutout. A distal end of the first cutout and a distal end of the other cutout are aligned with each other across the first arm. A proximate end of the other cutout is not aligned with a proximate end of the first cutout across the first arm. The display device further has a mount configured for mounting the display device to the cross-vehicle beam. The first fail portion has a second opening, and wherein the mount includes a bolt to engage with the second opening. A thickness of the first arm is substantially equal to and smaller than a width of the first opening so that the first arm is able to extend through the first opening.

In a second aspect, a display device for a vehicle comprises: a housing having a display, the housing defining: a mount configured for mounting the display device to a fail portion of a cross-vehicle beam in the vehicle; and an arm to extend through an opening of the cross-vehicle beam, the arm having a cutout configured to engage with the opening in response to the fail portion failing.

In a third aspect, a vehicle comprises: a vehicle body; a cross-vehicle beam mounted to the vehicle body in a transverse direction, the cross-vehicle beam including i) a fail portion, wherein a notch is formed in the fail portion, and ii) a pocket having an opening that faces substantially rearward in the vehicle; and a display device configured for being mounted to the cross-vehicle beam using the fail portion, the display device having an arm configured to extend through the opening, the arm having a cutout configured to engage with the opening in response to the fail portion failing.

BRIEF DESCRIPTION OF DRAWINGS

Like reference symbols in the various drawings indicate like elements.

DETAILED DESCRIPTION

Figure 1:
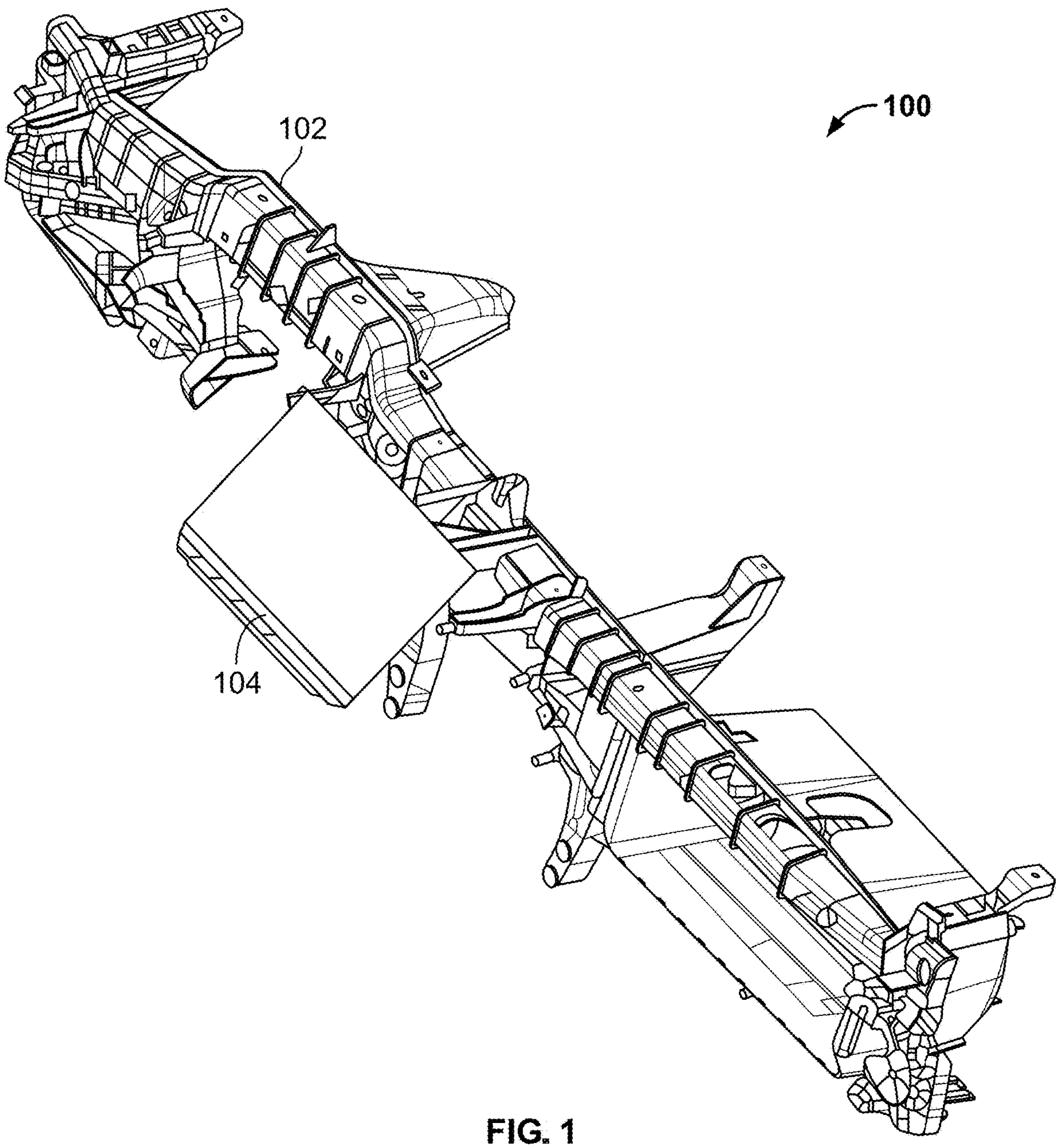
FIG. 1 shows a perspective view of an example of an assembly for a vehicle, the assembly including a cross-vehicle beam and a display device.

This document describes examples of systems and techniques for ensuring that a display device of a vehicle remains attached (i.e., is retained) after a collision event where an impact (e.g., a head impact) has disrupted the original attachment of the display device. A part of the attachment of the display device is designed as a fail portion that is intended to rupture upon severe impact. The display device also has a retention feature to prevent, in response to the rupture, that the display device becomes a projectile or otherwise a loose object.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle.

Examples herein refer to a cross-vehicle beam. As used herein, a cross-vehicle beam is a structural component installed in any type of vehicle so as to span substantially from one side of the vehicle to an opposite side of the vehicle. For example, a cross-car beam can extend between the left and right A-pillars of the vehicle.

Examples herein refer to a fail portion used for attaching a display device to a cross-vehicle beam. As used herein, a fail portion is any structure that is designed to rupture under some specified circumstance. In some implementations, the fail portion can be configured to rupture upon the display device being subjected to at least a severe impact. The fail portion can be designed with at least one weakened portion to facilitate the rupturing. A notch in a wall or other structure can serve as such a weakened portion.

Examples herein refer to a severe impact on a display device. As used herein, a severe impact means that the display device is subjected to a force sufficient to rupture the attachment of the display device. The attachment can meet all strength and stiffness requirements under normal circumstances. The characteristics of a severe impact can be defined by homologation requirements. In some implementations, a severe impact must involve an object of approximately the size and mass of a head hitting the display device. The acceleration of the object can be at least equal to about 70 times the natural acceleration of gravity. The result of impact can also depend on where on the display device the severe impact occurs.

Examples herein refer to a front, rear, top, or a bottom. These and similar expressions identify things or aspects in a relative way based on an express or arbitrary notion of perspective. That is, these terms are illustrative only, used for purposes of explanation, and do not necessarily indicate the only possible position, direction, and so on.

FIG. 1 shows a perspective view of an example of an assembly 100 for a vehicle, the assembly 100 including a cross-vehicle beam 102 and a display device 104. The assembly 100 or any component(s) thereof can be used with one or more other examples described elsewhere herein.

The cross-vehicle beam 102 is here schematically shown and can be a structural member extending transversely in a vehicle. The cross-vehicle beam 102 can be designed to support, and be positioned inside or underneath, an instrument panel in a vehicle. The display device 104 is then one of multiple vehicle components in the passenger compartment that may be directly or indirectly attached to the cross-vehicle beam 102. In some implementations, each end of the cross-vehicle beam 102 can be configured for attachment to a respective A-pillar in the vehicle. The cross-vehicle beam 102 can be made of any suitable material, including, but not limited to, metal (e.g., an alloy material).

The display device 104 can be mounted at any position relative to the cross-vehicle beam 102. In some implementations, the display device 104 is positioned substantially at a center of the vehicle in a transverse direction. The display device 104 is attached to the cross-vehicle beam 102 by an attachment configured to rupture upon severe impact; a retention feature ensures that the display device 104 is retained after impact, for example as described below.

Figure 2:
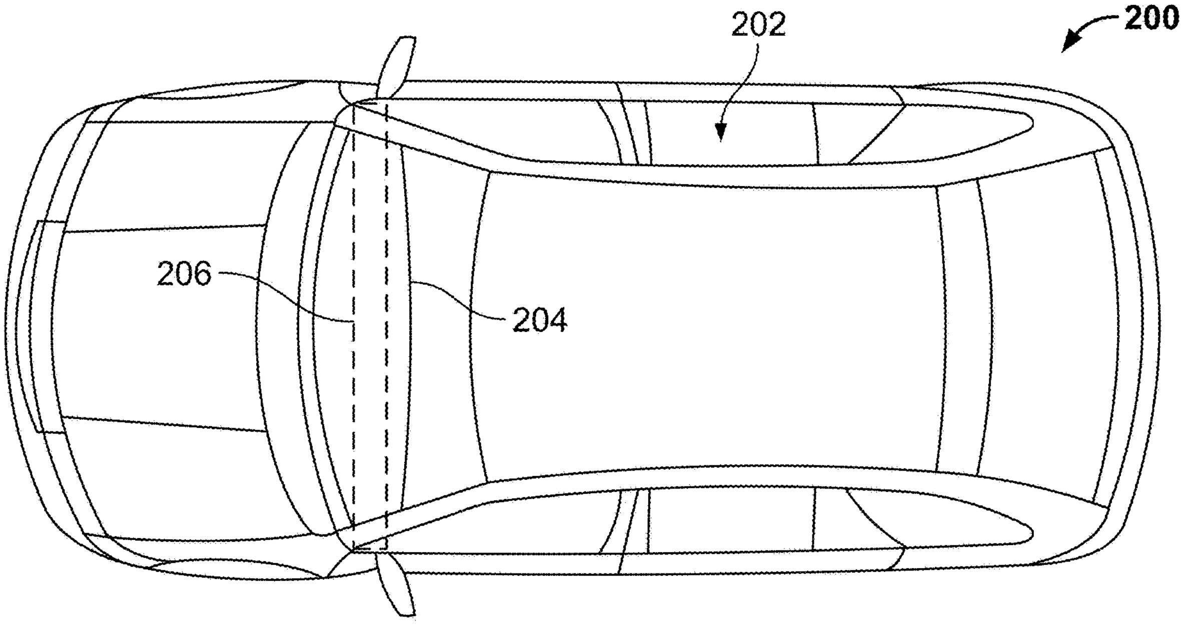
FIG. 2 shows an example of a vehicle that can include the assembly of FIG. 1.

FIG. 2 shows an example of a vehicle 200 that can include the assembly 100 of FIG. 1. The vehicle 200 can be used with one or more other examples described elsewhere herein. The vehicle 200 is shown from above and has a vehicle body with a passenger compartment 202 that is here partially visible through the windows. The vehicle 200 can have an instrument panel 204 positioned at a front of the passenger compartment 202. In some implementations, the instrument panel 204 extends substantially from one side to the other of the vehicle 200 in a transverse direction. A structure 206 is schematically illustrated as extending transversely in the vehicle 200 and is currently obscured by the instrument panel 204. In some implementations, the structure 206 can include the cross-vehicle beam 102 of FIG. 1. For example, the display device 104 can be mounted to the structure 206 in the vehicle 200.

Figure 3:
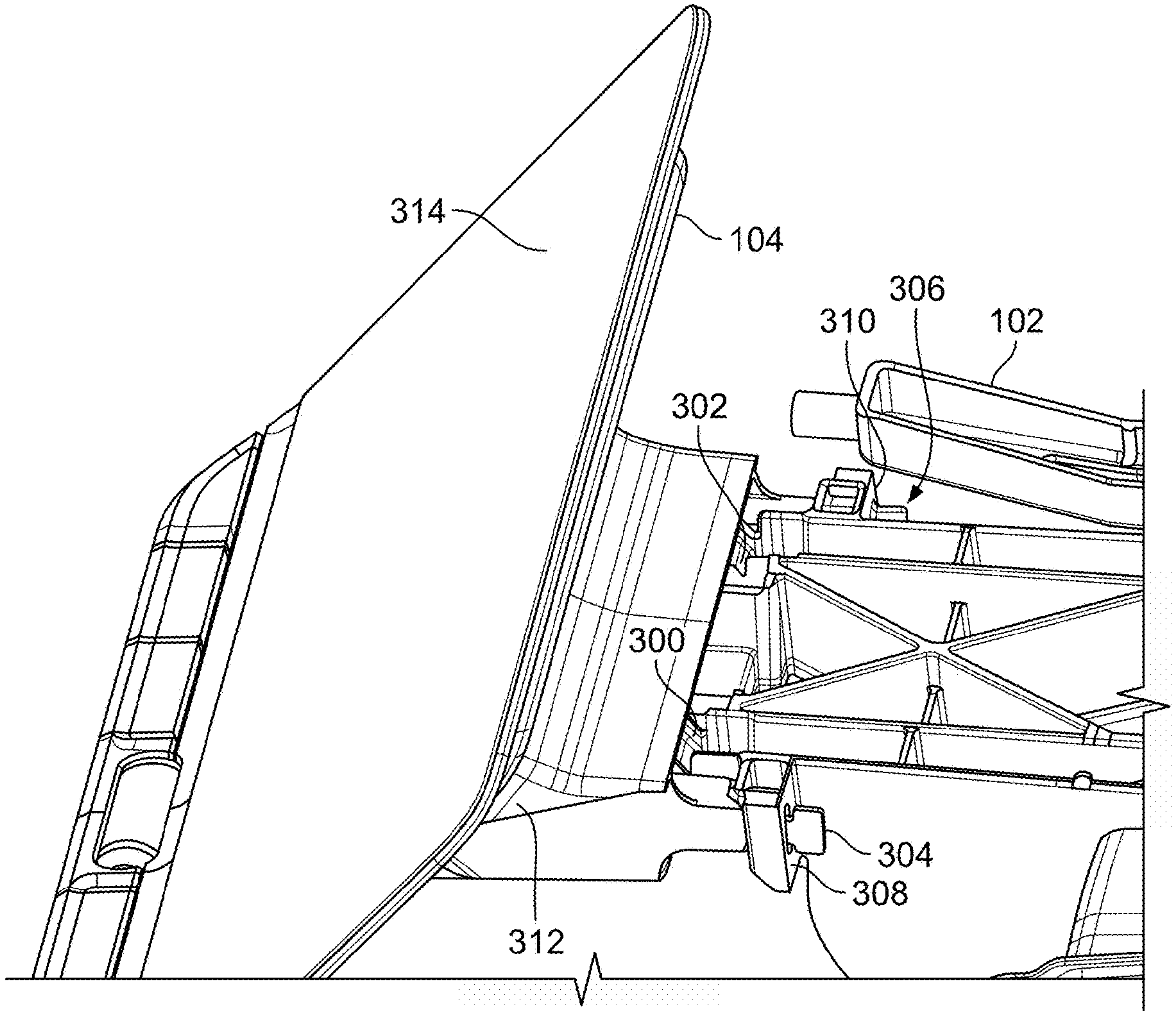
FIG. 3 shows a partial view of the cross-vehicle beam and the display device of FIG. 1.

FIG. 3 shows a partial view of the cross-vehicle beam 102 and the display device 104 of FIG. 1. The cross-vehicle beam 102 can include at least one portion that is used in attaching the display device 104 and that is designed to fail upon severe impact. Here, the cross-vehicle beam 102 has fail portions 300 and 302 that are currently partially obscured by the display device 104.

The display device 104 can include at least one retention feature that is designed to retain the display device 104 in response to failure of the at least one portion that was designed to fail. Here, the display device 104 has arms 304 and 306 configured to extend substantially forward in the vehicle. The arm 306 is currently obscured by the cross-vehicle beam 102. The cross-vehicle beam 102 can include at least one pocket, wherein the at least one retention feature is designed to engage with the at least one pocket in response to failure of the at least one portion that was designed to fail. Here, the cross-vehicle beam 102 has pockets 308 and 310, each having a respective opening that faces substantially rearward in the vehicle.

The fail portions 300 and 302, and the pockets 308 and 310, can be positioned in any of multiple locations on the cross-vehicle beam 102. In some implementations, the pocket 308 is positioned outboard of the fail portion 300 in the vehicle. In some implementations, the pocket 310 is positioned outboard of the fail portion 302 in the vehicle. For example, the fail portions 300 and 302, and the pockets 308 and 310, can all be horizontally aligned with each other in the cross-vehicle beam 102.

The display device 104 includes a housing 312 having a display 314. The housing 312 can be made from any or multiple materials, including, but not limited to, from a polymer material, or metal, or a combination thereof. The display 314 can use any electronic display technology compatible with the processors and/or other chips that output information in the vehicle.

Figure 4:
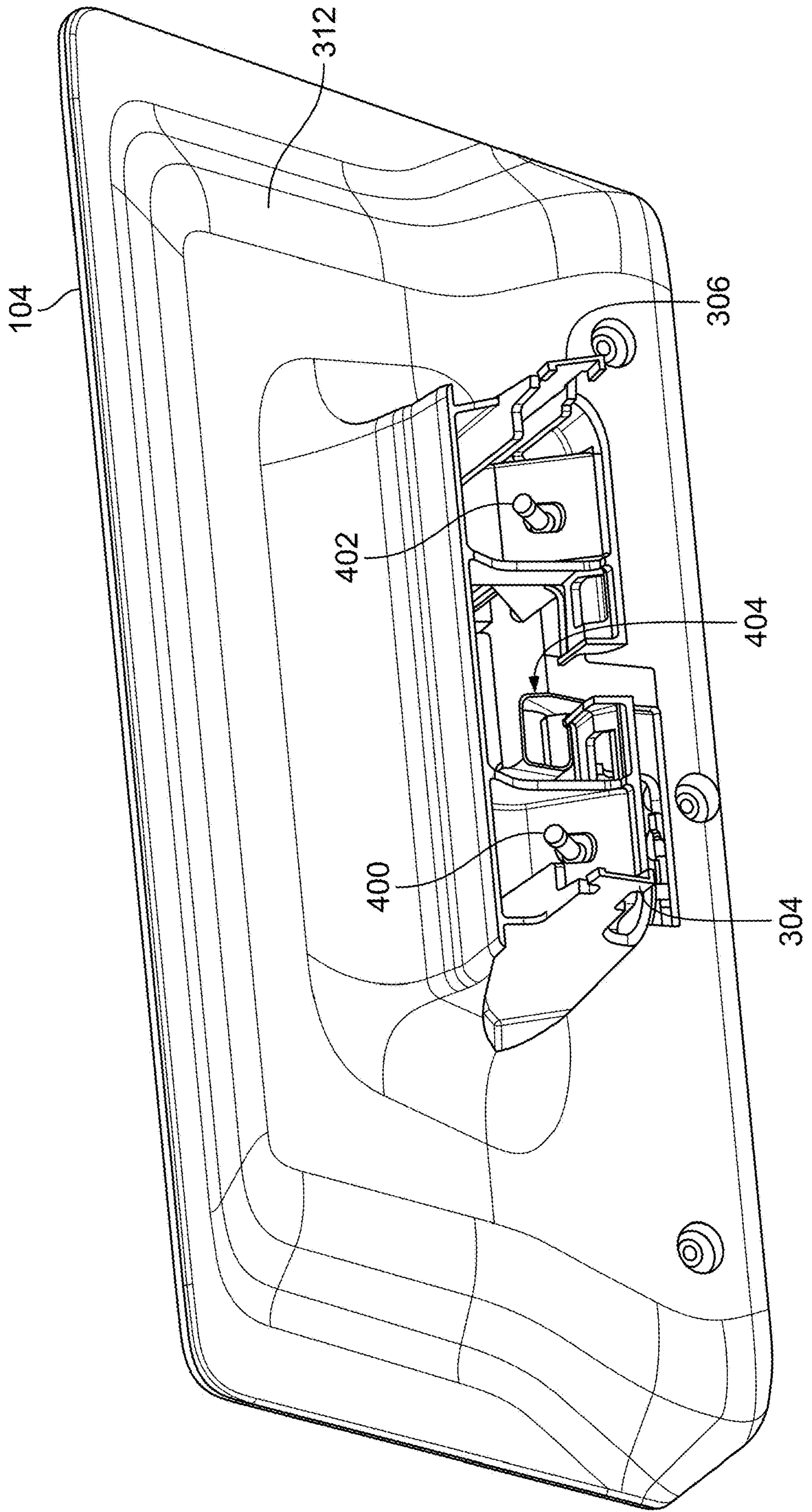
FIG. 4 shows an example of the display device of FIG. 1.

FIG. 4 shows an example of the display device 104 of FIG. 1. The display device 104 is here shown separate from any cross-vehicle beam, and viewed in perspective from its rear side, to better illustrate examples of how the display device 104 can be attached to the cross-vehicle beam. The display device 104 can have at least one mount configured for mounting the display device 104 to the cross-vehicle beam. In some implementations, the display device 104 has bolts 400 and/or 402. The bolts 400 and 402 can engage with the fail portions 300 and 302, respectively, of FIG. 3. For example, the bolts 400 and 402 can horizontally align with each other in the display device 104. Either or both of the bolts 400 and 402 can be positioned inboard of a respective one of the arms 304 and 306. For example, the housing 312 can have an opening 404 for receiving communication and power cables from the vehicle (e.g., in form of a harness).

Figure 5A:
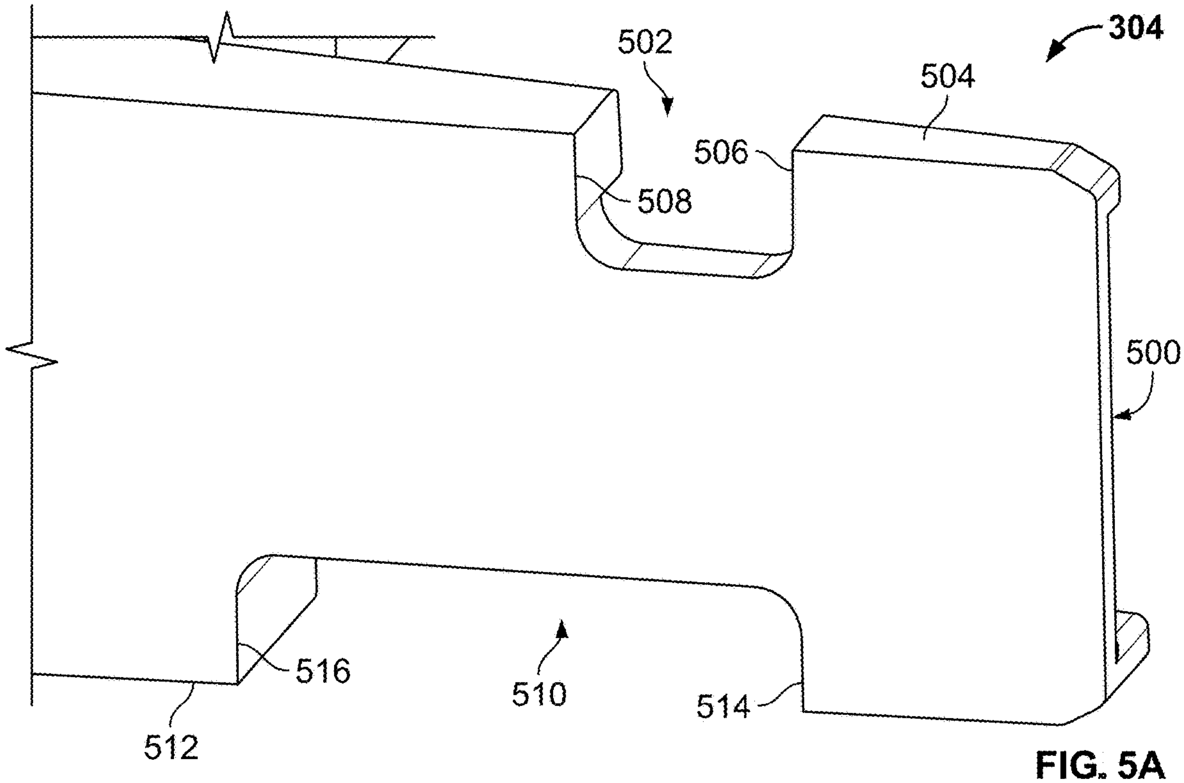
FIG. 5A shows an example of the arm of the display device of FIG. 3.
Figure 5B:
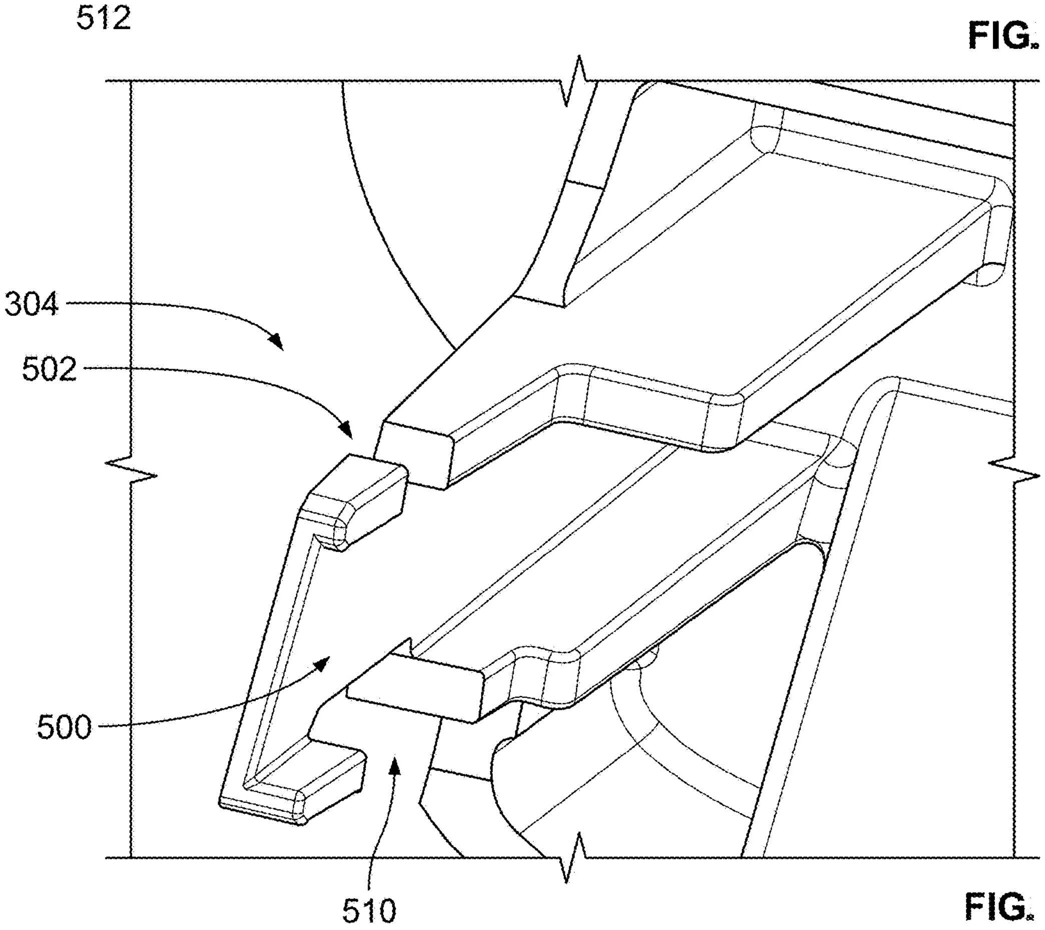
FIG. 5B shows an example of the arm of the display device of FIG. 3.

FIG. 5A shows an example of the arm 304 of the display device 104 of FIG. 3. FIG. 5B shows another example of the arm 304 of the display device 104. The arm 304 can be used with one or more other examples described elsewhere herein. The arm 304 can have any of multiple profiles in cross section along its length. In some implementations, the arm 304 has a profile that provides strength and/or stiffness. Here, the arm 304 has a channel profile 500.

The arm 304 has one or more cutouts along its length. Here, the arm 304 has a cutout 502 along an edge 504. For example, the edge 504 can face upward when the arm 304 and the display device 104 are installed in the vehicle. The cutout 502 is formed in part by a distal end 506 and a proximate end 508. The cutout 502 can have any of multiple shapes. Here, the cutout 502 is substantially U-shaped. In response to a severe impact on the display device 104, the cutout 502 engages with an opening in a cross-vehicle beam, for example as described below.

The arm 304 can also or instead have one or more other cutouts. Here, the arm 304 has a cutout 510 along an edge 512. The edges 504 and 512 are opposite from each other on the arm 304. For example, the edge 512 can face downward when the arm 304 and the display device 104 are installed in the vehicle. The cutout 510 is formed in part by a distal end 514 and a proximate end 516. The cutout 510 can have any of multiple shapes. Here, the cutout 510 is substantially U-shaped. The cutout 510 can engage with an opening in a cross-vehicle beam in response to a severe impact on the display device 104, for example as described below.

The cutouts 502 and 510 are positioned across a width of the arm 304 from each other. The cutout 502 will here be positioned vertically above the cutout 510 when the arm 304 and the display device 104 are installed in the vehicle. Either of the cutouts 502 or 510 can be wider than the other. Here, the cutout 510 is wider than the cutout 502. The distal end 506 of the cutout 502 can be aligned, across the arm 304, with the distal end 514 of the cutout 510. The proximate end 508 of the cutout 502 may not be aligned, across the arm 304, with the proximate end 516 of the cutout 510.

Figure 6:
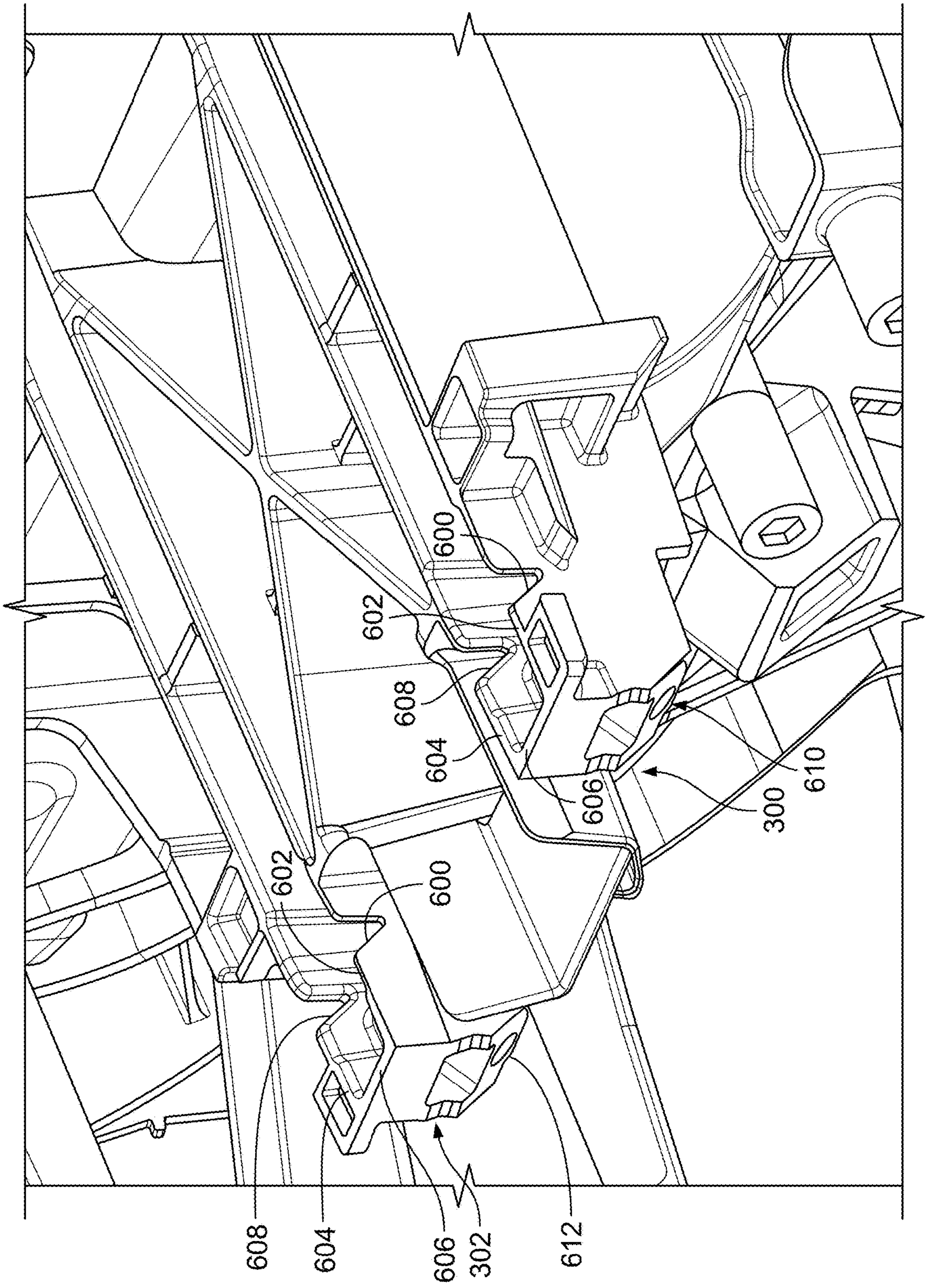
FIG. 6 shows an example of the fail portions of the cross-vehicle beam of FIG. 3.

FIG. 6 shows an example of the fail portions 300 and 302 of the cross-vehicle beam 102 of FIG. 3. The fail portions 300 and/or 302 can be used with one or more other examples described elsewhere herein. The fail portion 300 can extend from the cross-vehicle beam 102 substantially rearward in the vehicle. A notch 600 can be formed in the fail portion 300. As such, the fail portion 300 can be separated from a remainder of the cross-vehicle beam 102 by the notch 600. The notch 600 can be designed to facilitate failure of the fail portion 300 upon a severe impact.

The fail portion 300 can include parallel walls 602 and 604. The parallel walls 602 and 604 here extend substantially rearward in the vehicle. The fail portion 300 can include a transverse wall 606 that joins the parallel walls 602 and 604 to each other. In some implementations, the notch 600 is formed in the parallel wall 602, and a notch 608 is formed in the parallel wall 604. The notches 600 and 608 can have the same shape as each other, or different shapes. Here, each of the notches 600 and 608 has substantially a V-shape.

As mentioned, the cross-vehicle beam 102 can have the fail portion 300 and also the fail portion 302. In some implementations, the fail portion 302 can have parallel walls that extend substantially rearward in the vehicle, a transverse wall that joins the parallel walls, and a notch formed in either or both of the parallel walls. Such notch(es) can have the same shape as each other, or different shapes, such as substantially a V-shape. For example, the fail portion 302 can have substantially a corresponding structure to the structure of the fail portion 300.

The fail portions 300 and/or 302 can include at least part of a structure designed for mounting a display device to the cross-vehicle beam 102. In some implementations, the fail portion 300 has an opening 610. For example, a mount of the display device 104 in FIG. 4 (e.g., the bolt 400) can engage with the opening 610. In some implementations, the fail portion 302 has an opening 612. For example, a mount of the display device 104 in FIG. 4 (e.g., the bolt 402) can engage with the opening 612.

Figure 7:
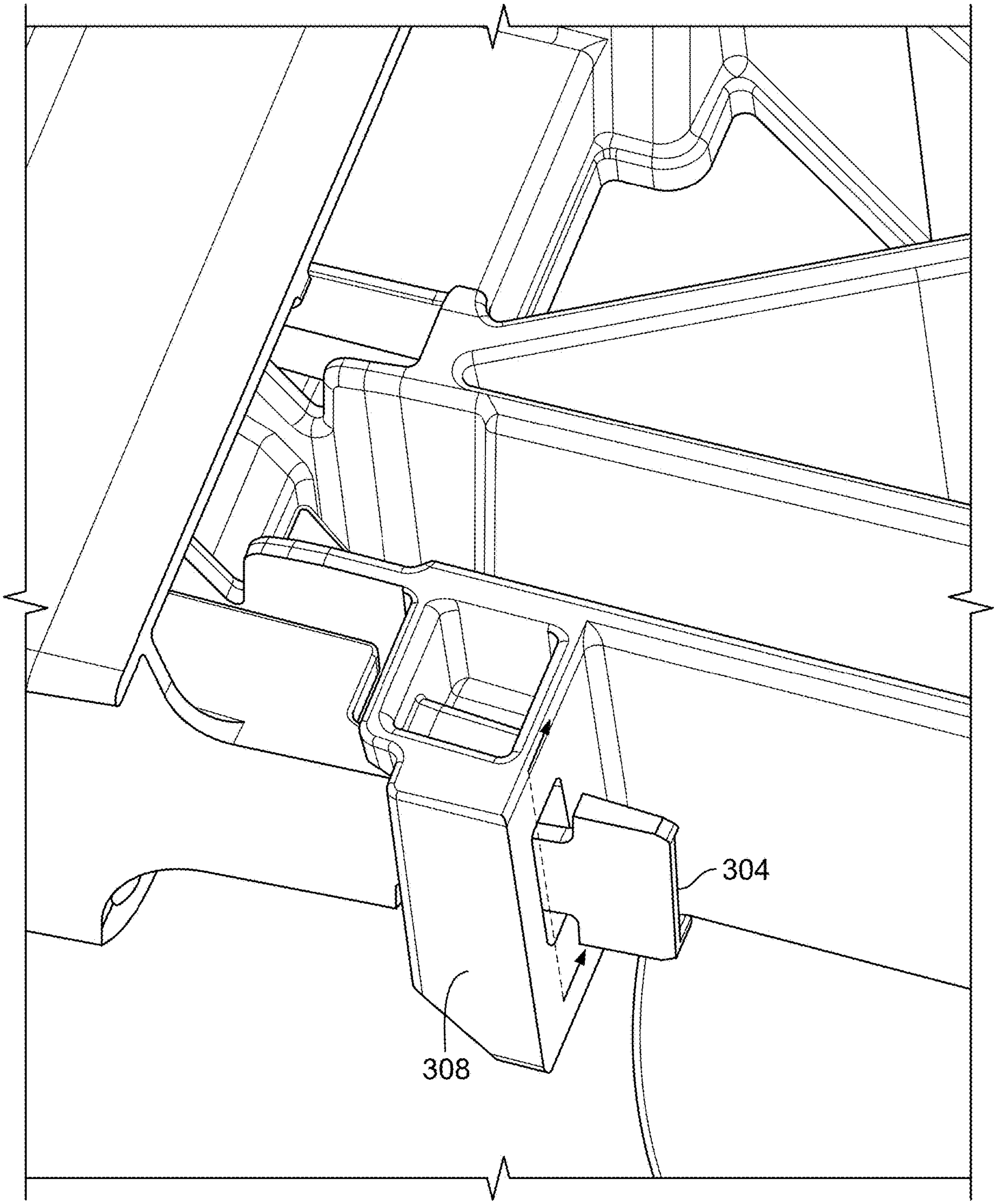
FIG. 7 shows an example of the arm of FIG. 5 extending through the pocket of the cross-vehicle beam of FIG. 3.

FIG. 7 shows an example of the arm 304 of FIG. 5 extending through the pocket 308 of the cross-vehicle beam 102 of FIG. 3.

Figure 8:
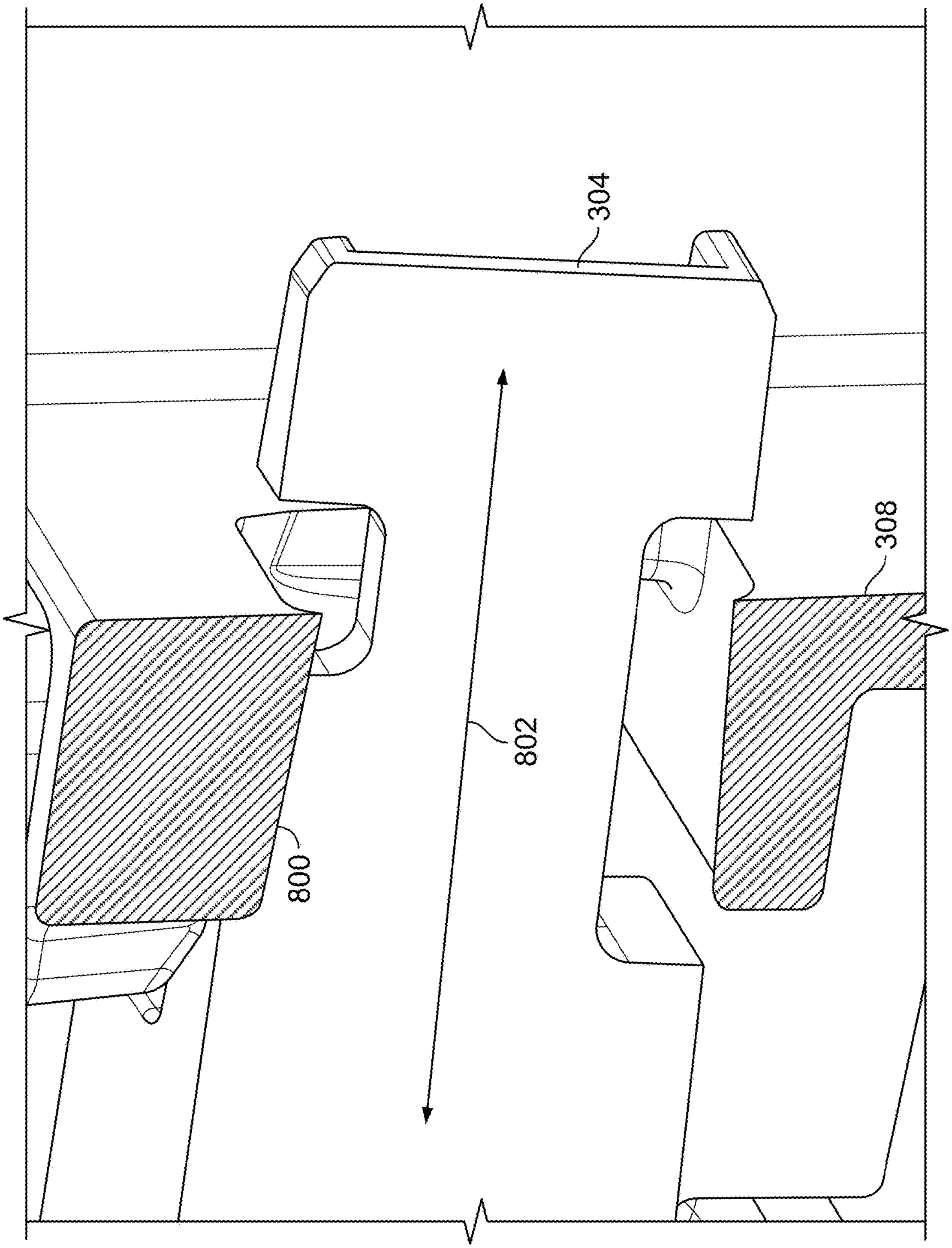
FIG. 8 shows an example section through the pocket of FIG. 7 when the display device is mounted to the cross-vehicle beam.

FIG. 8 shows an example section through the pocket 308 of FIG. 7 when the display device is mounted to the cross-vehicle beam. That is, this section shows an example of the arm 304 of FIG. 5 extending through an opening 800 of the pocket 308. This view is not a pure cross section but instead shows a perspective view of the cross section defined in FIG. 7.

There can be a relatively tight fit between the arm 304 and the opening 800. An arrow 802 here schematically illustrates the only direction in which the arm 304 can slide into and out of the opening 800. As such, the arm 304 can only be fitted through the opening of the pocket 308 when the arm 304 is properly oriented relative to the opening, namely aligned according to the arrow 802. During assembly when the display device is to be mounted to the cross-vehicle beam (e.g., by way of being mounted onto a fail portion), the arm 304 is able to be slid through the opening 800 due to the relatively small amount of wiggle room existing between the arm 304 and the opening 800 of the pocket 308. For example, a thickness of the arm 304 is substantially equal to and smaller than a width of the opening 800 so that the arm 304 is able to extend through the opening 800.

Figure 9:
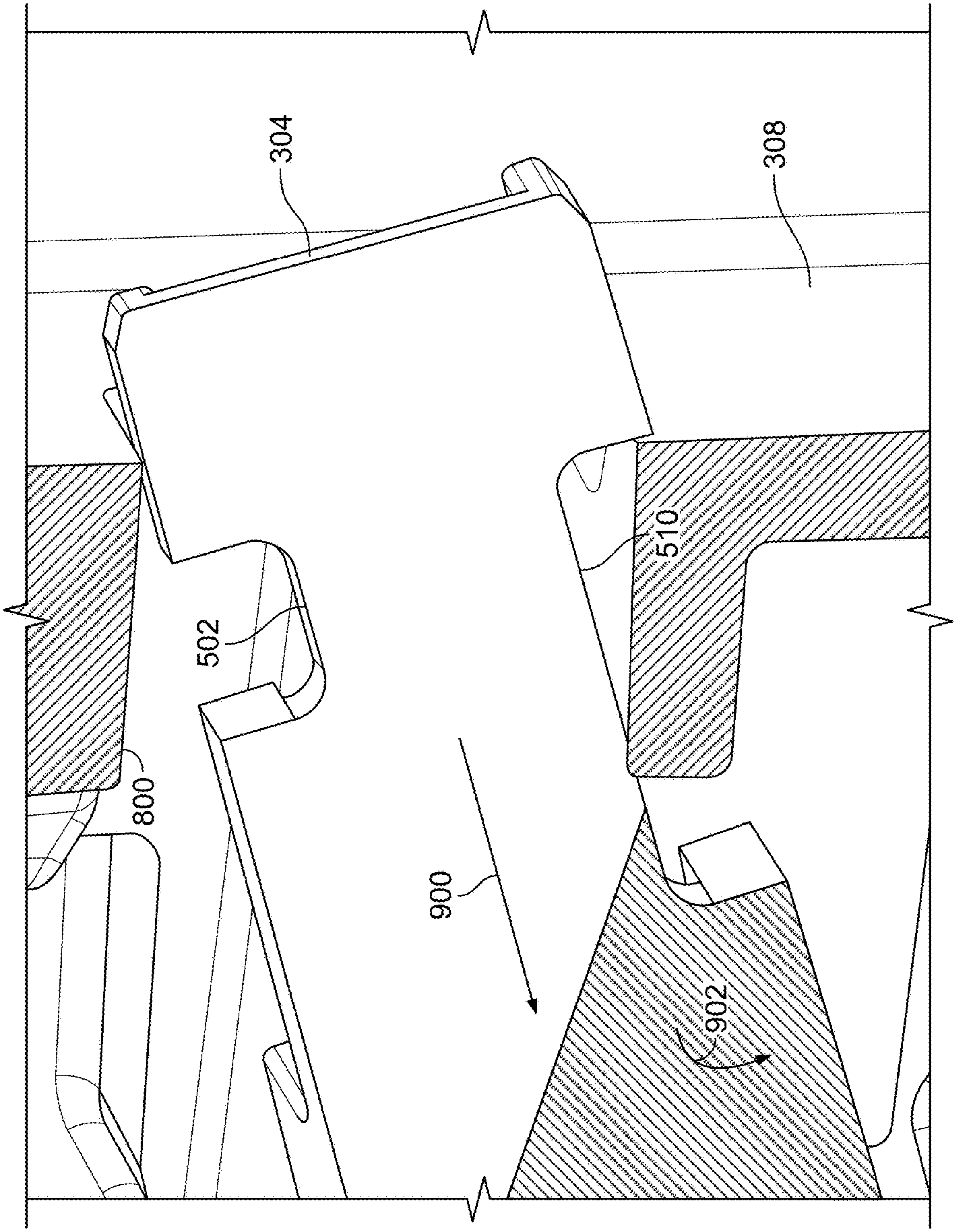
FIG. 9 shows an example section through the pocket of FIG. 7 when at least the fail portion of FIG. 6 has failed.

FIG. 9 shows an example section through the pocket 308 of FIG. 7 when at least the fail portion 300 of FIG. 6 has failed. For example, assume that a severe impact occurs on the display 314 of the display device 104 as shown in FIG.

3. In this example, the severe impact applies sufficient force on the mount between the display device 104 and the cross-vehicle beam 102 that the fail portions 300 and 302 rupture. For example, in FIG. 6 this corresponds to the notches 600 and 608 of the fail portion 300, and the corresponding notch(es) of the fail portion 302, all failing as designed due to the impact. The severe impact can cause the display device 104 to rotate in any direction (e.g., upward, downward, etc.) The failure of the mount between the display device 104 and the cross-vehicle beam 102 can cause the display device 104 to slide rearward in the vehicle (e.g., as schematically illustrated by an arrow 900) and rotate (e.g., as schematically illustrated by an arrow 902) from its installed position. That is, the sliding and rotation occur essentially due to the gravitational force on the display device 104 and are not dependent on the particular direction that the severe impact may drive the display device 104.

However, despite its mount having been ruptured and the display device 104 having moved, the display device 104 does not become a projectile or other loose object in the passenger compartment. This is because at least one cutout of the arm 304 engages with the cross-vehicle beam 102. Here, the arm 304 has the cutouts 502 and 510. For example, the cutout 510 can engage with a bottom portion of the opening 800 of the pocket 308. As another example, the cutout 502 can engage with a top portion of the opening 800 of the pocket 308. Some combination of engagements by both the cutouts 502 and 510 can occur. As such, a retention feature prevents the arm 304 from completely exiting the pocket 308, thereby making sure that the display device 104 does not become unrestrained. The present example discusses features of only the fail portion 300. When the cross-vehicle beam 102 also has another fail portion (e.g., the fail portion 302 in FIG. 3), there can be a corresponding engagement by a retention feature at that fail portion in response to the severe impact.

Figure 10:
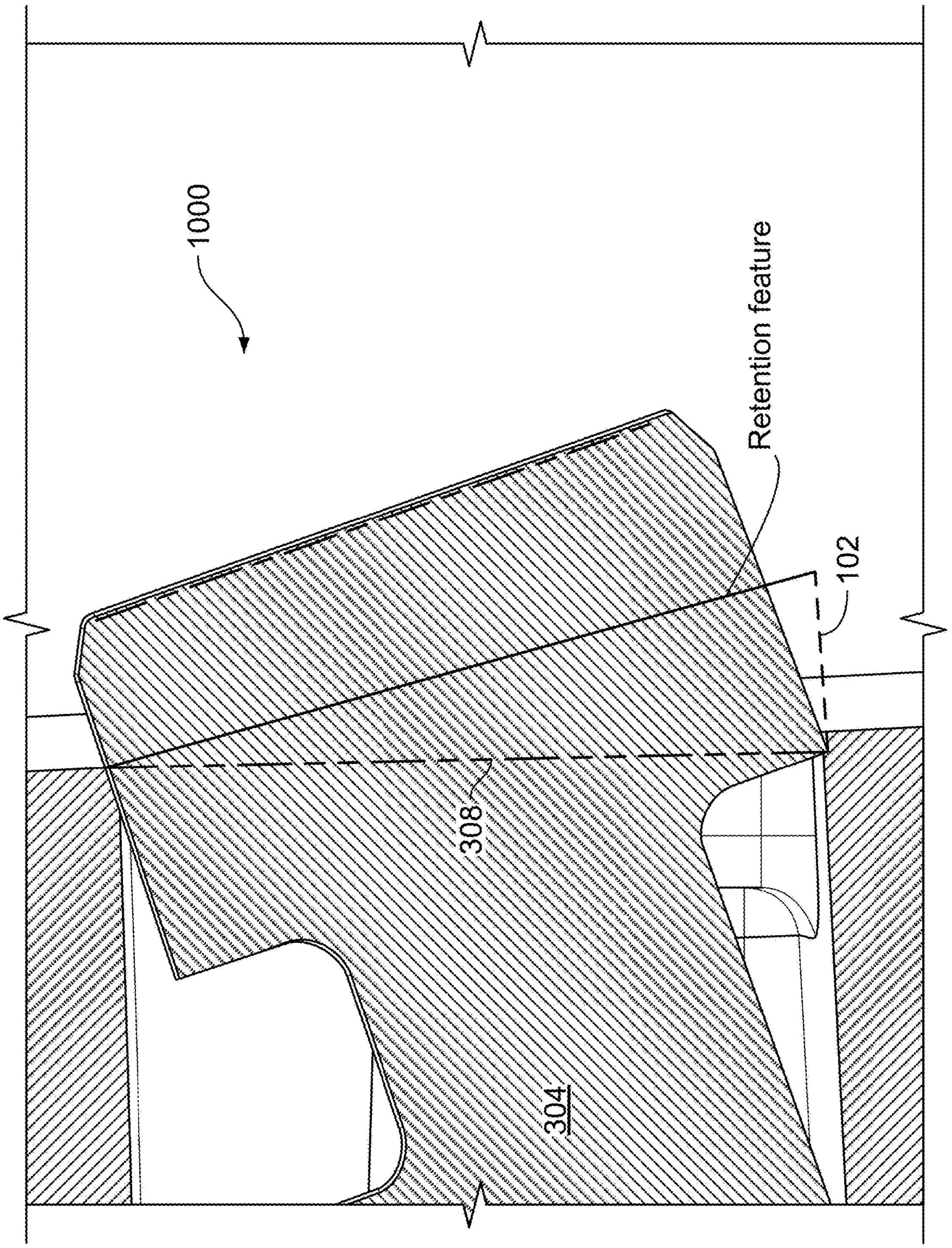
FIG. 10 schematically shows a triangular relationship representing engagement between the pocket of FIG. 7, the cross-vehicle beam of FIG. 3, and the arm of FIG. 5.

FIG. 10 schematically shows a triangular relationship 1000 representing engagement between the pocket 308 of FIG. 7, the cross-vehicle beam 102 of FIG. 3, and the arm 304 of FIG. 5. Namely, after a severe impact that ruptures the fail portion(s), the triangular relationship 1000 is formed with the retention feature (e.g., the arm 304 with the cutout 502 and/or 510) as the hypotenuse, the pocket 308 as one leg, and the cross-vehicle beam 102 as the other leg. Because the retention feature is the longer side (see, e.g., the triangular geometry formed in FIG. 9) of the three, jamming is assured to occur and the display device is retained to the cross-vehicle beam 102.

The present subject matter can be used with other features than a display device mounted to a cross-vehicle beam. For example, the present subject matter can be used to retain a display device (e.g., a screen) to the back of a vehicle seat during head impact. As another example, the present subject matter can be used to retain upper vehicle trim in the passenger compartment during deployment of a curtain airbag.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An assembly for a vehicle, the assembly comprising:
- a cross-vehicle beam including i) a first fail portion, wherein a first notch is formed in the first fail portion, and ii) a first pocket having a first opening that faces substantially rearward in the vehicle; and
- a display device mounted to the cross-vehicle beam using the first fail portion, the display device having a first arm configured to extend through the first opening, the first arm having a first cutout configured to engage with the first opening in response to failure of at least the first fail portion.

2. The assembly of claim 1, wherein the first arm has a channel profile.

3. The assembly of claim 1, wherein the first fail portion extends from the cross-vehicle beam substantially rearward in the vehicle, the first fail portion separated from a remainder of the cross-vehicle beam by the first notch.

4. The assembly of claim 1, wherein the first fail portion includes parallel walls extending substantially rearward in the vehicle and a transverse wall joining the parallel walls to each other.

5. The assembly of claim 4, wherein the first notch is formed in one of the parallel walls.

6. The assembly of claim 5, wherein the first notch has substantially a V-shape.

7. The assembly of claim 5, wherein the first fail portion further includes another notch formed in another of the parallel walls.

8. The assembly of claim 1, wherein the cross-vehicle beam further includes i) a second fail portion, wherein a second notch is formed in the second fail portion, and ii) a second pocket having a second opening that faces substantially rearward in the vehicle, and wherein the display device further includes a second arm configured to extend through the second opening, the second arm having a second cutout, wherein in response to failure of at least the first and second fail portions, the first cutout is configured to engage with the first opening, and the second cutout is configured to engage with the second opening.

9. The assembly of claim 8, wherein the first and second fail portions and the first and second openings are all horizontally aligned with each other.

10. The assembly of claim 9, wherein the first opening is positioned outboard of the first fail portion, and wherein the second opening is positioned outboard of the second fail portion.

11. The assembly of claim 1, wherein the first arm further has another cutout, the other cutout positioned across a width of the first arm from the first cutout.

12. The assembly of claim 11, wherein the first arm is configured so that the first cutout is positioned vertically above the other cutout when the display device is mounted to the cross-vehicle beam.

13. The assembly of claim 12, wherein the other cutout is wider than the first cutout.

14. The assembly of claim 12, a distal end of the first cutout and a distal end of the other cutout are aligned with each other across the first arm.

15. The assembly of claim 14, wherein a proximate end of the other cutout is not aligned with a proximate end of the first cutout across the first arm.

16. The assembly of claim 1, wherein the display device further has a mount configured for mounting the display device to the cross-vehicle beam.

17. The assembly of claim 16, wherein the first fail portion has a second opening, and wherein the mount includes a bolt to engage with the second opening.

18. The assembly of claim 1, wherein a thickness of the first arm is substantially equal to and smaller than a width of the first opening so that the first arm is able to extend through the first opening.

19. A display device assembly for a vehicle, the display device assembly comprising:

a cross-vehicle beam that includes a fail portion and a pocket having an opening;

a display device; and a housing configured for housing the display device, the housing defining:

amount configured for mounting the display device to the fail portion of the cross-vehicle beam in the vehicle; and an arm configured to extend through the opening of the cross-vehicle beam, the arm having a cutout configured to engage with the opening in response to the fail portion failing.

20. A vehicle comprising:

a vehicle body;

a cross-vehicle beam mounted to the vehicle body in a transverse direction, the cross-vehicle beam including i) a fail portion, wherein a notch is formed in the fail portion, and ii) a pocket having an opening that faces substantially rearward in the vehicle; and a display device configured for being mounted to the cross-vehicle beam using the fail portion, the display device having an arm configured to extend through the opening, the arm having a cutout configured to engage with the opening in response to the fail portion failing.

* * * * *